(12) United States Patent
Takagaki et al.

(10) Patent No.: US 12,232,226 B2
(45) Date of Patent: Feb. 18, 2025

(54) EXTENSIBLE MAST, PRODUCTION METHOD THEREFOR, PHOTOVOLTAIC PADDLE, AND OUTER SPACE STRUCTURE

(71) Applicant: Mitsubishi Electric Corporation, Tokyo (JP)

(72) Inventors: Kazunori Takagaki, Tokyo (JP); Sohei Samejima, Tokyo (JP); Kazushi Sekine, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 140 days.

(21) Appl. No.: 18/012,239

(22) PCT Filed: Aug. 3, 2020

(86) PCT No.: PCT/JP2020/029641
§ 371 (c)(1),
(2) Date: Dec. 22, 2022

(87) PCT Pub. No.: WO2022/029827
PCT Pub. Date: Feb. 10, 2022

(65) Prior Publication Data
US 2023/0254946 A1 Aug. 10, 2023

(51) Int. Cl.
*H05B 3/36* (2006.01)
*B32B 3/08* (2006.01)
(Continued)

(52) U.S. Cl.
CPC ............. *H05B 3/36* (2013.01); *B32B 3/08* (2013.01); *B32B 5/02* (2013.01); *B32B 5/26* (2013.01);
(Continued)

(58) Field of Classification Search
CPC ....... H01L 31/00–078; Y02E 10/50–60; B32B 2457/12
(Continued)

(56) References Cited

FOREIGN PATENT DOCUMENTS

| JP | 2011-510180 A | 3/2011 |
| JP | 2014-008929 A | 1/2014 |

(Continued)

OTHER PUBLICATIONS

International Search Report and Written Opinion mailed on Sep. 24, 2020, received for PCT Application PCT/JP2020/029641, filed on Aug. 3, 2020, 8 pages including English Translation.
(Continued)

*Primary Examiner* — Bach T Dinh
(74) *Attorney, Agent, or Firm* — XSENSUS LLP

(57) ABSTRACT

An extensible mast according to the present disclosure includes a first fiber layer made of a fiber-reinforced plastic, a second fiber layer that is arranged in contact with the first fiber layer and made of a fiber-reinforced plastic having a thermal expansion coefficient in a longitudinal direction larger than a thermal expansion coefficient in the longitudinal direction of the fiber-reinforced plastic applied to the first fiber layer, and an electric heating wire arranged on the second fiber layer. The number of times of overlapping of the electric heating wire in different layers when the first fiber layer, the second fiber layer, and the electric heating wire are wound and retracted in a roll shape is minimized. Thus, the elastic restoring force of the extensible mast can be maintained while an increase in weight and volume is suppressed.

14 Claims, 12 Drawing Sheets

(51) Int. Cl.
  *B32B 5/02* (2006.01)
  *B32B 5/26* (2006.01)
  *B32B 7/027* (2019.01)
  *B32B 37/06* (2006.01)
  *B32B 37/20* (2006.01)
  *B64G 1/10* (2006.01)
  *B64G 1/22* (2006.01)
  *B64G 1/44* (2006.01)
  *H02S 30/20* (2014.01)

(52) U.S. Cl.
  CPC .............. *B32B 7/027* (2019.01); *B32B 37/06* (2013.01); *B32B 37/203* (2013.01); *B64G 1/10* (2013.01); *B64G 1/2225* (2023.08); *B64G 1/443* (2013.01); *H02S 30/20* (2014.12); *B32B 2260/023* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2457/12* (2013.01); *H05B 2203/003* (2013.01)

(58) Field of Classification Search
  USPC .................................................. 136/243–265
  See application file for complete search history.

(56) References Cited

FOREIGN PATENT DOCUMENTS

| | | |
|---|---|---|
| JP | 2018-001965 A | 1/2018 |
| WO | 2009/085384 A1 | 7/2009 |
| WO | 2018/135625 A1 | 7/2018 |
| WO | 2019/230019 A1 | 12/2019 |

OTHER PUBLICATIONS

Hoang et al., "Commercialization of Deployable Space Systems' Roll-Out Solar Array (ROSA) Technology for Space Systems Loral (SSL) Solar Arrays", IEEE, Aerospace Conference, Jun. 30, 2016, pp. 1-12.

Extended European Search Report issued Aug. 25, 2023 in corresponding European Patent Application No. 20948194.4, 8 pages.

EXTENSIBLE MAST, PRODUCTION METHOD THEREFOR, PHOTOVOLTAIC PADDLE, AND OUTER SPACE STRUCTURE

CROSS-REFERENCE TO RELATED APPLICATION

The present application is based on PCT filing PCT/JP2020/029641, filed Aug. 3, 2020, the entire contents of which are incorporated herein by reference.

TECHNICAL FIELD

The present disclosure relates an extensible mast, a production method therefor, a photovoltaic paddle, and an outer space structure.

BACKGROUND ART

In recent years, demand for high-speed, large-capacity communications using artificial satellites has increased, and the development of communication and broadcasting satellite equipped with high-performance communication equipment has been progressing. The increasing power consumption of the communication equipment in such satellites has created a need for a photovoltaic paddle capable of supplying a large amount of power. Solar cells are mounted on the photovoltaic paddle to convert sunlight into electrical energy to generate power. The solar paddle is normally stored in the fairing, which is the tip of a rocket, in a folded state at the time of the launch and is expanded into a desired shape in outer space.

Currently, in artificial satellites, a rigid-type photovoltaic paddle in which solar cells are arranged on a plurality of connected flat panels is typically used. However, because there is a limit to the capacity of the fairing in which a satellite can be housed, the size and the number of panels are limited for the rigid-type photovoltaic paddle.

Therefore, a flexible photovoltaic paddle in which the solar cells are arranged on a flexible film-like substrate called a blanket instead of the flat plate panel has attracted attention as a device for achieving both reduction in size and weight and high power for an artificial satellite. Non-Patent Document 1 discloses a technique in which a blanket to which solar cells are attached is wound in a roll shape and extended using an extensible mast.

It is known that the extensible mast is typically made of a member having high elasticity, such as a lightweight fiber-reinforced plastic. However, when the extensible mast made of the fiber-reinforced plastic is stored for a long time in a wound form or an extended form, there is a problem in that stress relaxation occurs and elastic restoring force is reduced. Patent Document 1 discloses a technique in which an assisting member composed of a long metal plate having elasticity is provided to be laminated so as to be relatively movable in the longitudinal direction along an extensible mast, and the transition of the main body of the extensible mast to the extended state or the wound state is assisted by the elastic restoring force of the support member.

CITATION LIST

Patent Document

Patent Document 1; Japanese Unexamined Patent Application Publication No. 2018-1965

Non-Patent Document

Non-Patent Document 1; Bao Hoang; Steve White; Brian Spence; Steven Kiefer, "Commercialization of Deployable Space Systems' roll-out solar array (ROSA) technology for Space Systems Loral (SSL) solar arrays" Aerospace Conference, 30 Jun. 2016

SUMMARY OF INVENTION

Problems to be Solved by Invention

However, in the extensible mast of Patent Document 1, because of the usage of a metallic assisting member, there is a problem in that the extensible mast is increased in weight and the roll diameter of the extensible mast when it is wound is increased, so that the volume thereof when retracted is increased.

It is an object of the present disclosure to overcome the problem described above and to provide an extensible mast that maintains the elastic restoring force of the extensible mast while suppressing an increase in weight and volume, a method of manufacturing the extensible mast, a photovoltaic paddle, and an outer space structure.

Means for Solving Problems

An extensible mast according to the present disclosure includes a first fiber layer made of a fiber-reinforced plastic, a second fiber layer that is arranged in contact with the first fiber layer and made of a fiber-reinforced plastic having a thermal expansion coefficient in a longitudinal direction larger than a thermal expansion coefficient in the longitudinal direction of the fiber-reinforced plastic applied to the first fiber layer, and an electric heating wire arranged on the second fiber layer. The number of times of overlapping of the electric heating wire in different layers when the first fiber layer, the second fiber layer, and the electric heating wire are wound and retracted in a roll shape is minimized.

Further, the extensible mast according to the present disclosure includes the first fiber layer made of a fiber-reinforced plastic, the second fiber layer that is arranged in contact with the first fiber layer and made of a fiber-reinforced plastic having a thermal expansion coefficient in a longitudinal direction larger than a thermal expansion coefficient in the longitudinal direction of the fiber-reinforced plastic applied to the first fiber layer, and an electric heating wire arranged on the second fiber layer. The electric heating wire is in a sine wave shape with a constant period, and is arranged so as to have different amplitudes in the longitudinal direction.

A method of manufacturing an extensible mast according to the present disclosure includes forming a prepreg laminate by winding around a shaft member a first fiber layer made of a fiber-reinforced plastic and a second fiber layer made of a fiber-reinforced plastic having a thermal expansion coefficient larger in a longitudinal direction than a thermal expansion coefficient in the longitudinal direction of the fiber-reinforced plastic applied to the first fiber layer, covering the prepreg laminate wound around the shaft member with a bagging film and sealing the covered prepreg laminate with a sealing material, placing the sealed prepreg laminate in an autoclave, and pressurizing and heating the prepreg laminate from outside the bagging film, taking out the prepreg laminate from the autoclave, and removing the shaft member, the bagging film, and the sealing material, and arranging the electric heating wire on a surface of the second fiber layer such that the number of times of overlapping of the electric heating wire in different layers when the electric heating wire is wound and retracted in a roll shape is minimized.

Further, the method of manufacturing the extensible mast according to the present disclosure includes forming the prepreg laminate by winding the first fiber layer made of a fiber-reinforced plastic and the second fiber layer made of a fiber-reinforced plastic having a thermal expansion coefficient in a longitudinal direction larger than a thermal expansion coefficient in the longitudinal direction of the fiber-reinforced plastic applied to the first fiber layer around a shaft member, covering the prepreg laminate wound around the shaft member with a bagging film and sealing the covered prepreg laminate with a sealing material, placing the sealed prepreg laminate in an autoclave, and pressurizing and heating the prepreg laminate from outside the bagging film, taking out the prepreg laminate from the autoclave, and removing the shaft member, the bagging film, and the sealing material, and arranging the electric heating wire on a surface of the second fiber layer so as to be in a sine wave shape with a constant period and to have different amplitudes in the longitudinal direction.

Effect of Invention

According to the extensible mast and the method of manufacturing the extensible mast of the present disclosure, it is possible to provide an extensible mast that maintains the elastic restoring force of the extensible mast while suppressing an increase in weight and volume, a method of manufacturing the extensible mast, a photovoltaic paddle, and an outer space structure.

MODES FOR CARRYING OUT INVENTION

Figure 1:
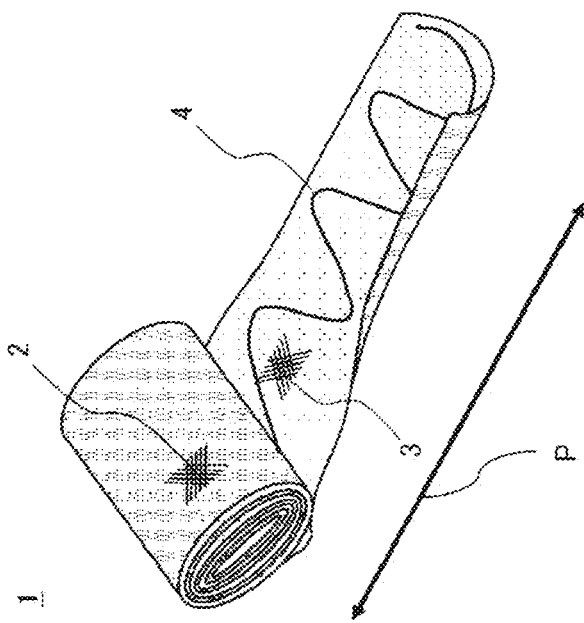
FIG. 1 is a perspective view showing a schematic configuration of an extensible mast according to Embodiment 1 of the present disclosure.

Hereinafter, an extensible mast, a method of manufacturing the extensible mast, a photovoltaic paddle to which the extensible mast is applied, and an outer space structure will be described for carrying out the present disclosure with reference to the drawings. In the description of the drawings, the same parts or corresponding parts are denoted by the same reference numerals, and a repetitive description is omitted.

Embodiment 1

FIG. 1 is a perspective view showing a schematic configuration of an extensible mast 1 according to Embodiment 1 for carrying out the present disclosure. The extensible mast 1 is composed of a first fiber layer 2 made of a fiber-reinforced plastic, a second fiber layer 3 made of a fiber-reinforced plastic, and an electric heating wire 4, and has a function of winding itself in a roll shape to be retracted and a function of extending itself into a rod shape. The second fiber layer 3 is arranged in contact with the first fiber layer 2. The thermal expansion coefficient in a longitudinal direction of the fiber-reinforced plastic applied to the second fiber layer 3 is larger than that in an axial direction of the fiber-reinforced plastic applied to the first fiber layer 2. In FIG. 1, the longitudinal direction for the thermal expansion coefficient in the extensible mast 1 at the extended state is represented by a direction P. As the fiber-reinforced plastic, for example, a carbon fiber-reinforced plastic in which an epoxy resin is impregnated into carbon fibers can be used. The electric heating wire 4 is arranged on the second fiber layer 3. The electric heating wire 4 is arranged such that the number of times of overlapping of the electric heating wire in different layers is minimized when the mast is wound into multiple layers in a roll shape to be retracted. As the electric heating wire 4, for example, a nichrome wire can be used.

Figure 2:
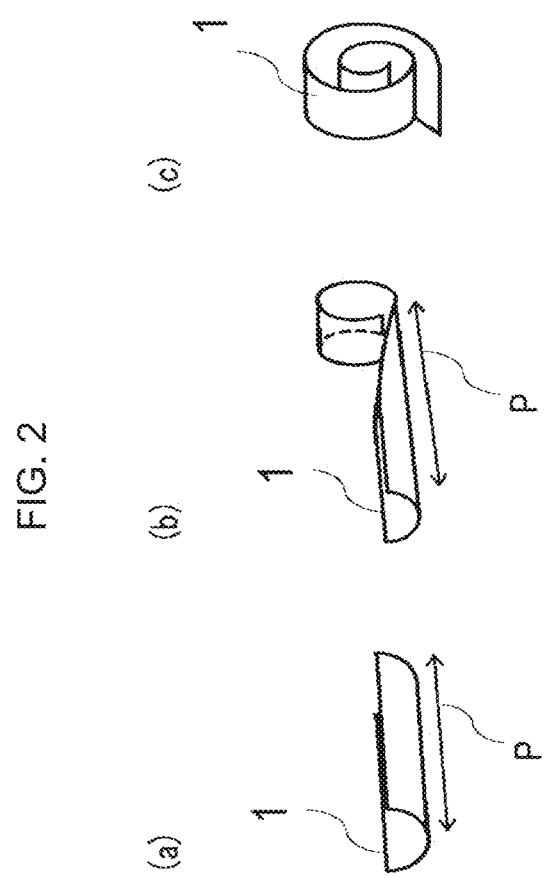
FIG. 2 is an explanatory diagram for explaining the extensible mast according to Embodiment 1 of the present disclosure.

FIG. 2 is an explanatory diagram for explaining the extensible mast 1 according to Embodiment 1 for carrying out the present disclosure. FIG. 2(a) shows the extensible mast in an extended state, FIG. 2(b) shows the extensible mast in a transition from the extended state to the retracted state, and FIG. 2(c) shows the extensible mast in the retracted state. As shown in FIG. 2(a), in the extended state, the extensible mast has a semi-cylindrically rounded boom shape. Further, as shown in FIG. 2(c), in the retracted state, the extensible mast 1 is wound into a roll shape. Thus, the extensible mast 1 can maintain its shape in each of the boom shape and the roll shape.

When the extensible mast 1 makes a transition from the extended state to the retracted state, as shown in FIG. 2(b), elastic strain energy is accumulated in the extensible mast 1. The extensible mast 1 is extended by releasing the accumulated elastic strain energy. Therefore, in a short term, by arranging the extensible mast 1 on each side of a blanket, for example, it is possible to retract or extend the blanket without requiring a special drive unit. However, when it is kept in a long term in the wound form or the extended form, there is a problem in that stress relaxation occurs and elastic restoring force decreases.

The extensible mast in the present disclosure includes the first fiber layer 2 made of the fiber-reinforced plastic, the second fiber layer 3 made of the fiber-reinforced plastic, which is arranged in contact with the first fiber layer 2 and has the thermal expansion coefficient in the longitudinal direction that is larger than the thermal expansion coefficient in the longitudinal direction of the fiber-reinforced plastic applied to the first fiber layer 2, and the electric heating wire 4 arranged on the second fiber layer 3. The characteristic feature thereof is such that the number of times of the overlapping of the electric heating wire in different layers is minimized when the first fiber layer 2, the second fiber layer 3, and the electric heating wire 4 are wound into multiple layers in the roll shape to be retracted. Since the thermal expansion coefficient in the axial direction of the fiber-reinforced plastic of the second fiber layer 3 is larger than the thermal expansion coefficient in the axial direction of the fiber-reinforced plastic of the first fiber layer 2, when a temperature change occurs in the extensible mast 1, force is generated to retract or extend the extensible mast 1. Further, since the electric heating wire is arranged on the second fiber layer 3 such that the number of times of the overlapping of the electric heating wire among different layers is minimized when the electric heating wire is retracted in the roll shape, an assist by thermal stress can be obtained while avoiding an increase in weight and volume, and the elastic restoring force of the extensible mast can be maintained even when stress relaxation occurs due to the wound form or the extended form in a long term. As the fiber-reinforced plastic of the first fiber layer 2, for example, a fiber-reinforced plastic (thermal expansion coefficient in longitudinal direction −1.4 ppm/K) made of carbon fiber K13C (manufactured by Mitsubishi Chemical Corporation) and an epoxy resin can be used, and as the fiber-reinforced plastic of the second fiber layer 3, for example, a fiber-reinforced plastic (thermal expansion coefficient in longitudinal direction −0.1 ppm/K) made of T800S (manufactured by Toray Industries, Inc.) and an epoxy resin can be used.

Figure 3:
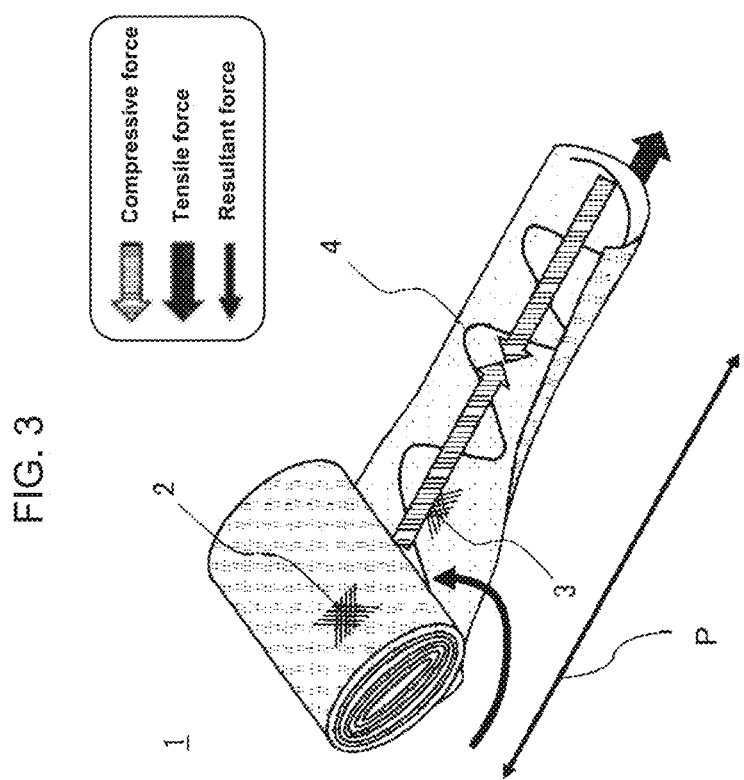
FIG. 3 is a perspective view for explaining a retracted state of the extensible mast according to Embodiment 1 of the present disclosure.

FIG. 3 is a perspective view for explaining the retracted state of the extensible mast 1 according to Embodiment 1 for carrying out the present disclosure. In the retracted state, the extensible mast 1 extended into the rod shape is wound into the roll shape from an end portion of the extensible mast 1 so that the extensible mast 1 is wound into a wound form. At this time, in the extensible mast 1 of Embodiment 1, since the thermal expansion coefficient of the second fiber layer 3 in the longitudinal direction of the fiber-reinforced plastic is larger than the thermal expansion coefficient of the first fiber layer 2 in the axial direction, at the time of the cooling from the curing temperature of the resin, tensile forces are generated in the first fiber layer 2 in the longitudinal direction (direction P in FIG. 3), and opposing compressive forces are generated in the second fiber layer 3 in the longitudinal direction (direction P in FIG. 3) and as a result, resultant force acts in the direction in which the extensible mast 1 is retracted. This resultant force remains as an internal stress in the first fiber layer 2 and the second fiber layer 3 in the wound form in the roll shape. Therefore, no special drive unit is not required, and it is possible to assist the force with which the extensible mast makes the transition of its form into the wound form at the time of the cooling from the curing temperature of the resin. The extensible mast 1 in the wound form in the retracted state can maintain the wound form by fixing its end portion.

Figure 4:
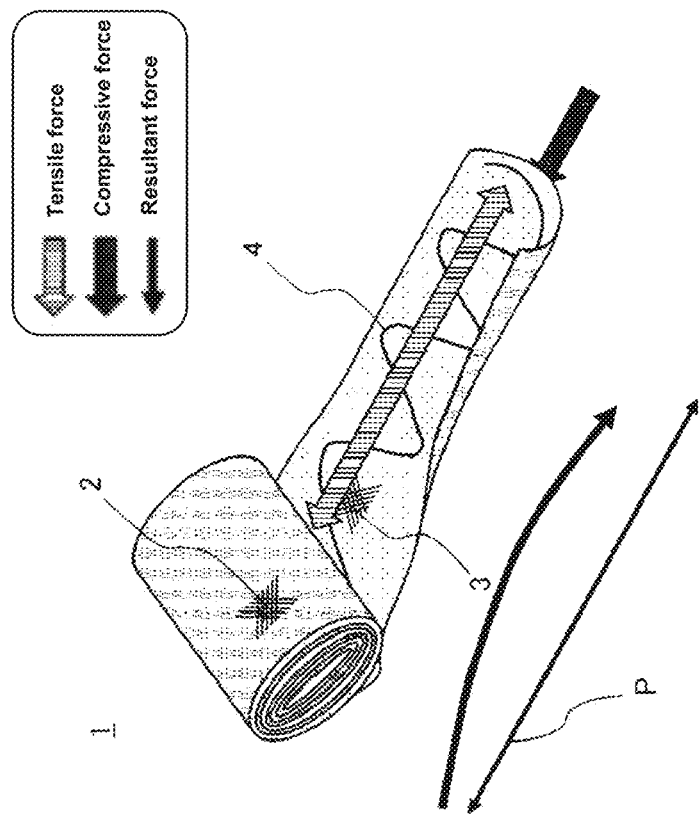
FIG. 4 is a perspective view for explaining an extended state of the extensible mast according to Embodiment 1 of the present disclosure.

FIG. 4 is a perspective view for explaining the extended state of the extensible mast 1 according to Embodiment 1 for carrying out the present disclosure. In the extended state, since force is being generated to extend the extensible mast 1 wound in the roll shape into the rod shape, the extensible mast 1 turns into the extended form. Part of the force required for the extension is obtained by releasing the stress remaining as the internal stress in the first fiber layer 2 and the second fiber layer 3 in the retraction step. Specifically, the remaining stress can be released by releasing the fixing of the end portion that is fixed in order to maintain the wound form. However, when it is stored for a long term in the wound form or the extended form, there is a problem in that stress relaxation occurs and elastic restoring force decreases. In the extensible mast 1 according to Embodiment 1, the fiber-reinforced plastic of the second fiber layer 3 has a larger thermal expansion coefficient in the axial direction than that in the fiber-reinforced plastic of the first fiber layer 2 in the longitudinal direction. Therefore, since the second fiber layer 3 expands more than the first fiber layer 2 by causing an electric current to flow through the electric heating wire 4 and causing the electric heating wire 4 to generate heat, the compressive forces are generated in the longitudinal direction (direction P in FIG. 4) in the first fiber layer 2, and the tensile forces are generated in the longitudinal direction (direction P in FIG. 4) in the second fiber layer 3, and as a result, a resultant force acts in the direction of extending the extensible mast 1. With the remaining stress in addition to the extension force, it is possible to assist the force of extending the extensible mast 1 into the rod shape in the extended state without any additional member. As a result, even if the stress relaxation occurs due to the wound form for a long term, the extensible mast can be extended without requiring a special drive unit. The greater the difference between the thermal expansion coefficient in the longitudinal direction of the second fiber layer 3 and the thermal expansion coefficient in the longitudinal direction of the first fiber layer 2, the greater the force that assists the transition from the retracted state to the extended state.

Figure 5:
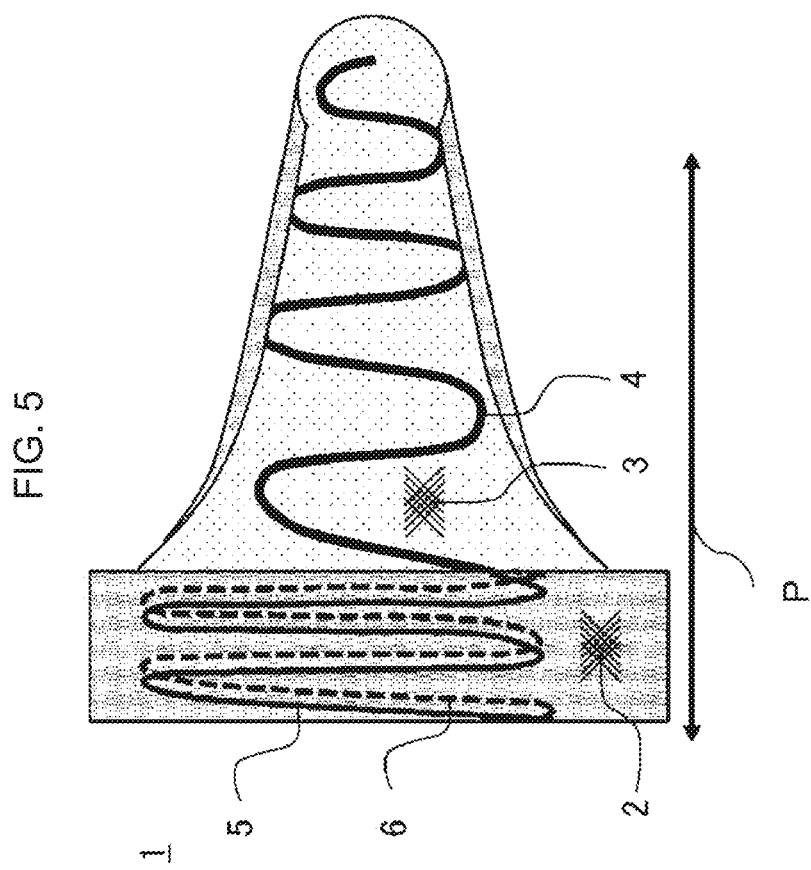
FIG. 5 is a plan view illustrating an overlap of electric heating wires in different layers when the extensible mast according to Embodiment 1 of the present disclosure is retracted.

FIG. 5 is a plan view for explaining the overlapping of the electric heating wire of different layers when the extensible mast 1 according to Embodiment 1 of the present disclosure is retracted. The electric heating wires 5 and 6 shown in FIG. 5 are those in some of the layers of the electric heating wire 4 in which the extensible mast 1 is wound in multiple layers in the roll shape and retracted, and the heating wires 5 and 6 represent heating wires of different layers. As shown by the electric heating wires 5 and 6, the electric heating wire 4 is arranged in the longitudinal direction (direction P in FIG. 5) such that the number of times of the overlapping of the electric heating wire in different layers is minimized when the electric heating wire is wound and stored in the roll shape. The electric heating wire 4 has, for example, a sine wave shape with a constant period, and is arranged so as to have different amplitudes in the longitudinal direction. By forming the sine wave shape with a constant period, the phase is shifted due to the influence of the thickness of the layer sheet when it is wound into the roll shape, and the amplitudes are different in the longitudinal direction, so that the overlapping area of the electric heating wire 4 at the time of retraction can be minimized. When the electric heating wire 4 is formed into a sine wave shape, it is necessary to design the wavelength so that the first fiber layer 2 and the second fiber layer 3 can be appropriately heated by causing a current to flow through the electric heating wire 4, and for example, the wavelength can be twice the width of the extensible mast 1. Note that, when the electric heating wire 4 has a sine wave shape, the number of the times of the overlapping of the electric heating wire 4 may be a minimum in accordance with the designed sine wave, and for example, the minimum number of the times of the overlapping is four in a sine wave of two periods.

In the present embodiment, carbon fiber-reinforced plastic in which epoxy resin is impregnated into carbon fiber is used as the fiber-reinforced plastic, but materials other than carbon fiber and epoxy resin may be used. In the present embodiment, the carbon fiber is used for both the first fiber layer 2 and the second fiber layer 3, but a different fiber may be used. As a fiber of the fiber-reinforced plastic, for example, carbon fiber, glass fiber, quartz fiber, SiC fiber, and aramid fiber can be used. As a base plastic material of the fiber-reinforced plastic, epoxy resin, cyanate ester resin, unsaturated polyester resin, polyether ether ketone resin, thermoplastic polyimide resin, polyphenylene sulfide resin, and the like can be used.

In the present embodiment, the nichrome wire is used as the electric heating wire, but any material that generates heat by causing an electric current to flow may be used, and for example, a nickel-chromium-based alloy or an iron-chromium-aluminum-based alloy may be used.

In the present embodiment, the electric heating wire 4 is arranged in the form of the sine wave having a constant period, it is not limited to the form. The electric heating wire 4 may be, for example, a triangular wave or a superimposed wave of sine waves having a plurality of frequencies, provided that the number of times of the overlapping when the electric heating wire 4 is wound and retracted in the roll shape may be minimized. In addition, the number of heating wires 4 may be plural instead of one. In this case, for example, by arranging them so as not to be parallel to the longitudinal direction of the extensible mast 1, it is possible to minimize the number of times of the overlapping while maintaining a wide arrangement range of the heating wire.

As described above, the extensible mast according to the present disclosure is provided with the first fiber layer made of the fiber-reinforced plastic, the second fiber layer 3 made of the fiber-reinforced plastic, which is arranged in contact with the first fiber layer 2 and has a thermal expansion coefficient in the longitudinal direction larger than the thermal expansion coefficient in the longitudinal direction of the fiber-reinforced plastic applied to the first fiber layer 2, and an electric heating wire 4 arranged on the second fiber layer 3, and is characterized in that when the first fiber layer 2, the second fiber layer 3 and the electric heating wire 4 are wound and retracted in the roll shape, the number of times of the overlapping of the electric heating wire in different layers is minimized. Since the thermal stress caused by the difference in their thermal expansion coefficients in the longitudinal direction between the first fiber layer 2 and the second fiber layer 3 causes the force to make a transition to the wound form during the cooling from the molding temperature, the extensible mast can be easily wound and retracted in the roll shape. On the other hand, when it is heated using an electric heating wire, force for making the transition to the extended form works, so that no special drive unit is required, and the extension can be performed by assisting the force for making the transition to the extended form of the extensible mast. Further, since the electric heating wire is arranged on the second fiber layer such that the number of times of the overlapping when the electric heating wire is retracted in the roll shape is minimized, the phase shifts due to the influence of the thickness of the sheet when it is wound in the roll shape, so that the overlapping area is minimized and the increase in weight and volume can be suppressed to the minimum.

Embodiment 2

Figure 6:
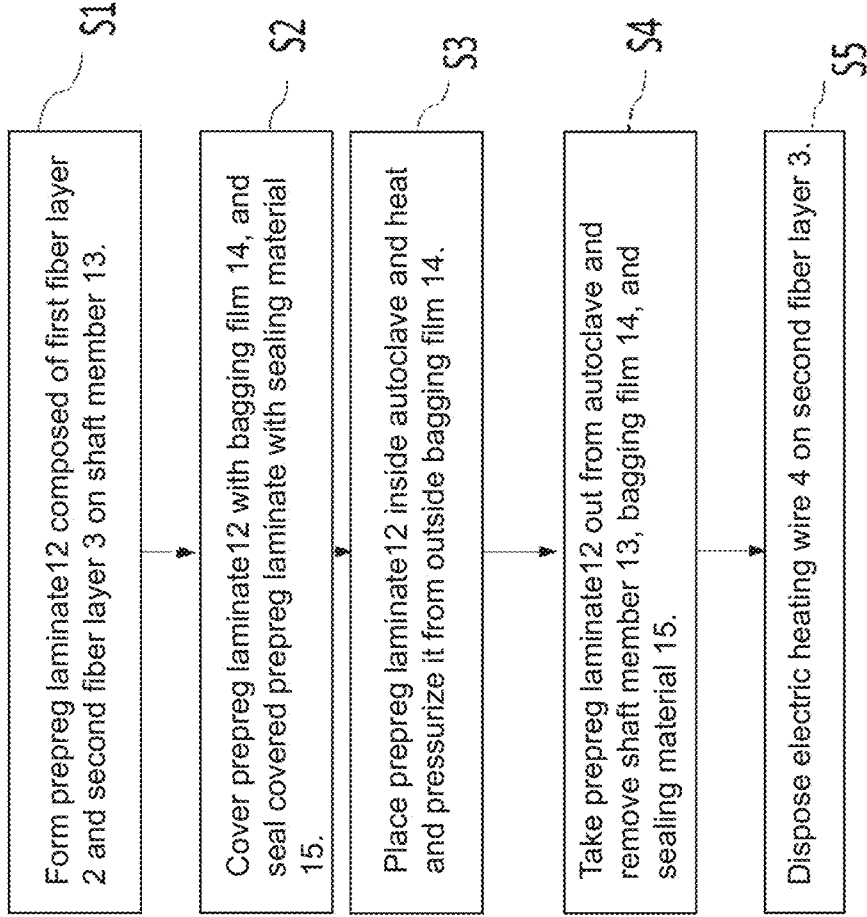
FIG. 6 is a flowchart showing a manufacturing process for an extensible mast according to Embodiment 2 of the present disclosure.
Figure 7:
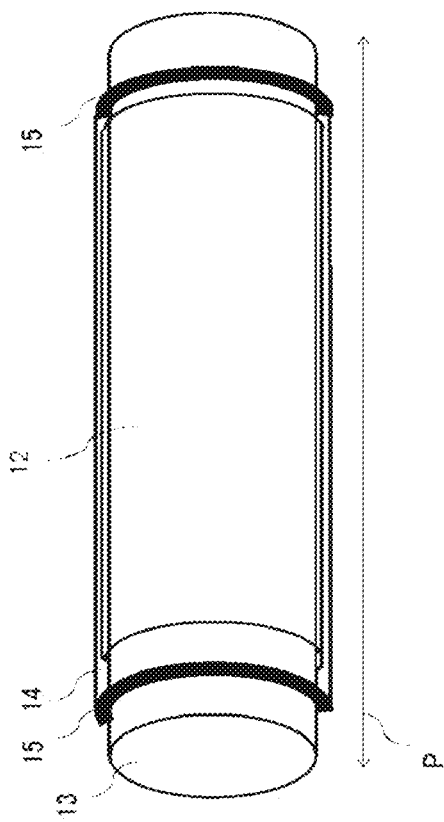
FIG. 7 is an explanatory diagram showing one step of manufacturing the extensible mast according to Embodiment 2 of the present disclosure.

Next, a method of manufacturing the extensible mast 1 according to Embodiment 1 for carrying out the present disclosure will be described. FIG. 6 is a flowchart showing a manufacturing process in Embodiment 2 for carrying out the present disclosure. FIG. 7 is an explanatory diagram showing one step of manufacturing an extensible mast according to Embodiment 2 for carrying out the present disclosure.

In steps S1 to S5, a member including the first fiber layer 2 made of fiber-reinforced plastic and the second fiber layer 3 made of fiber-reinforced plastic, excluding the electric heating wire 4, is produced in the extensible mast 1. First, in step S1, a method using a prepreg material in which a resin obtained by integrating a resin and a fiber is semi-cured will be described. First, on a substantially cylindrical shaft member 13, a prepreg material of a fiber-reinforced plastic of the second fiber layer 3 is wound and arranged so as to entirely cover the shaft member 13 in the circumferential direction. Next, a prepreg material of the fiber-reinforced plastic of the first fiber layer 2 is wound around and arranged on the prepreg material of the fiber-reinforced plastic of the second fiber layer 3 to form a prepreg laminate 12. The thermal expansion coefficient of the fiber-reinforced plastic applied to the second fiber layer 3 in the longitudinal direction is larger than that of the fiber-reinforced plastic applied to the first fiber layer 2 in the longitudinal direction. At this time, the direction of winding around the shaft member 13 is perpendicular to the extending direction P.

In step S2, as shown in FIG. 7, the prepreg laminate 12 wound around the shaft member 13 is entirely covered with a bagging film 14 and sealed with a sealing material 15. After the sealing with the sealing material 15, air inside the bagging film 14 is discharged by operating a pump (not shown) to bring the prepreg laminate 12 into a reduced pressure state.

In step S3, the prepreg laminate 12 is placed in an autoclave and heated and pressurized from outside the bagging film 14. For example, a temperature of 120° C. is maintained for 3 hours under 3 atm.

In step S4, the prepreg laminate 12 is taken out from the autoclave, and the shaft member 13, the bagging film 14 and the sealing material 15 are removed from the prepreg laminate 12. The prepreg laminated body 12 removed from the autoclave is machined to form an open cross-section by providing a slit portion in the longitudinal direction, thereby completing a member of the extensible mast 1, which is composed of the first fiber layer 2 and the second fiber layer 3, excluding the electric heating wire 4.

Next, in step S5, the member composed of the first fiber layer 2 and the second fiber layer 3 is formed into the extended form, and the electric heating wire 4 is arranged on the surface of the second fiber layer 3. The electric heating wire 4 is arranged such that the number of times of the overlapping of the electric heating wire in different layers when the electric heating wire is wound and retracted in the roll shape is minimized. That is, it has a sine wave shape with a constant period and is arranged such that its amplitude is different in the longitudinal direction. In this case, laser projection or the like may be used in order to arrange the electric heating wire 4 at an accurate position. In order to prevent the electric heating wire 4 from being displaced, the electric heating wire 4 may be temporarily fixed to the surface of the second fiber layer 3 with an adhesive tape or the like. Then, an adhesive is applied from above along the arranged electric heating wire 4. If an adhesive tape or the like is used to prevent positional deviation, the adhesive tape or the like is removed before applying the adhesive. Curing is accelerated by applying heat or ultraviolet rays depending on the adhesive, and the electric heating wire 4 is integrated with the second fiber layer 3, thereby completing the extensible mast 1.

Here, the condition for heating the prepreg laminate 12 under pressure varies depending on the type of the resin constituting the prepreg laminate 12. In the present embodiment, the prepreg laminate 12 is arranged so as to entirely cover substantially cylindrical shaft member 13 in the circumferential direction, but if the prepreg laminate 12 is arranged so as to form a C-shape instead of entirely covering the substantially cylindrical shaft member 13, the open cross-section can be formed without machining after the manufacturing. Further, although the prepreg of the fiber-reinforced plastic is used in the present embodiment, hand lay-up, resin transfer molding, or the like may be used. Although machining is used as the processing method of the prepreg laminate 12 in the present embodiment, it is sufficient to form an open cross-section by providing a slit in the longitudinal direction of the prepreg laminate 12, for example, laser processing may be used. In the present embodiment, the electric heating wire 4 is arranged on the second fiber layer 3 and then the adhesive is applied thereto, but it is sufficient that the electric heating wire 4 can be mounted on the surface of the second fiber layer 3, and the adhesive may be first applied to the arrangement position of the electric heating wire 4 and then the electric heating wire 4 may be arranged thereon. Before the step of pressurizing and heating the prepreg laminate 12, the electric heating wire 4 may be arranged on the surface of the prepreg material of the second fiber layer 3, and the second fiber layer 3 and the electric heating wire 4 may be integrated in the step of pressurizing and heating the prepreg laminate 12. At this time, the adhesive may or may not be applied along the electric heating wire 4. Note that, as the adhesive for bonding the electric heating wire 4 to the surface of the second fiber layer 3, for example, an adhesive of acrylic type, epoxy type, silicon type, phenol type, polyethylene type, polyimide type, urethane type, polyurethane type or the like can be used.

As described above, the method of manufacturing the extensible mast according to the present disclosure comprises a step of winding the first fiber layer made of the fiber-reinforced plastic and the second fiber layer 3 made of the fiber-reinforced plastic having a thermal expansion coefficient in the longitudinal direction larger than that of the fiber-reinforced plastic applied to the first fiber layer in the longitudinal direction around the shaft member 13 to form a prepreg laminate 12, a step of covering the prepreg laminate 12 with the bagging film 14 and sealing the prepreg laminate 12 with the sealing material 15, a step of placing the prepreg laminate 12 in the autoclave and heating and pressurizing the prepreg laminate 12 from outside the bagging film 14, a step of taking the prepreg laminate 12 out from the autoclave and removing the shaft member 13, the bagging film 14, and the sealing material 15, and a step of arranging the electric heating wire 4 on the surface of the second fiber layer 3, thereby manufacturing the extensible mast 1. The extensible mast 1 is provided with the first fiber layer 2 made of the fiber-reinforced plastic, the second fiber layer 3 made of the fiber-reinforced plastic, which is arranged in contact with the first fiber layer 2 and has a thermal expansion coefficient in the longitudinal direction larger than the thermal expansion coefficient of the fiber-reinforced plastic applied to the first fiber layer 2 in the longitudinal direction, and the electric heating wire arranged on the second fiber layer 3, and is characterized in that when the first fiber layer 2, the second fiber layer 3 and the electric heating wire 4 are wound and retracted in the roll shape, the number of times of the overlapping of the electric heating wire in different layers is minimized. Therefore, the transition of the extensible mast to the extension state or the wound state can be assisted by the thermal stress caused by the difference in the thermal expansion coefficients between the first fiber layer 2 and the second fiber layer 3 without requiring a special drive unit.

Embodiment 3

Figure 8:
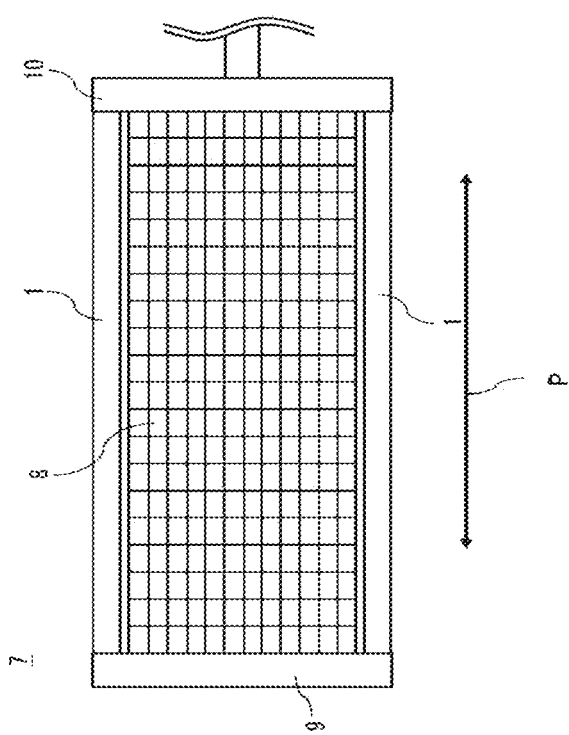
FIG. 8 is a plan view showing a schematic configuration of a photovoltaic paddle according to Embodiment 3 of the present disclosure.
Figure 9:
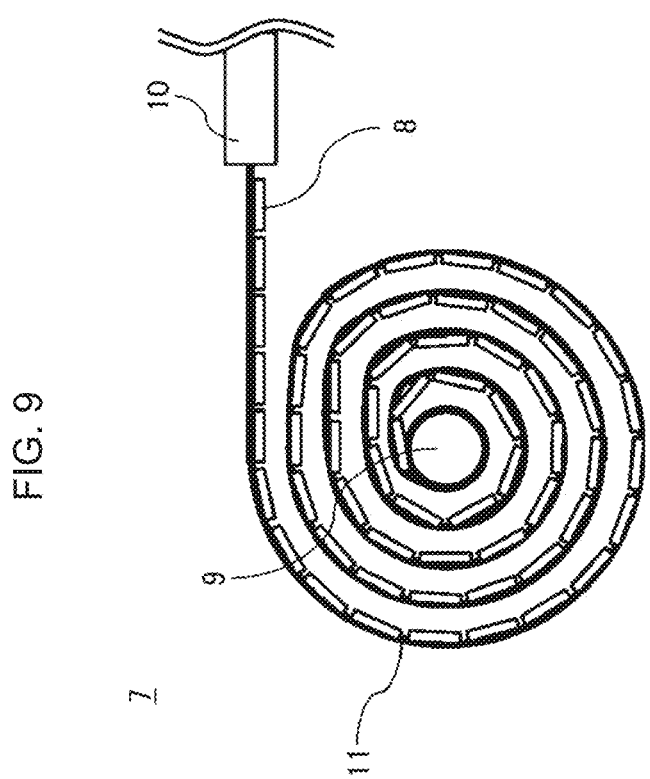
FIG. 9 is a side view showing a schematic configuration of the photovoltaic paddle according to Embodiment 3 of the present disclosure.

Next, a photovoltaic paddle to which the extensible mast 1 according to Embodiment 1 for carrying out the present disclosure is applied will be described with reference to FIG. 8 and FIG. 9. In FIG. 8 to FIG. 9, the same reference numerals as those in FIG. 1 denote the same or corresponding components. In the following description, the points which are the same as those of Embodiment 1 are omitted, and the different points will be mainly described.

FIG. 8 is a plan view showing a schematic configuration of a photovoltaic paddle 7 according to Embodiment 3 for carrying out the present disclosure. FIG. 8 shows the photovoltaic paddle 7 with the extensible mast 1 being in an extended form. FIG. 9 is a side view showing a schematic configuration of the photovoltaic paddle 7 according to Embodiment 3 for carrying out the present disclosure. FIG. 9 shows the photovoltaic paddle 7 with the extensible mast 1 being in a wound form.

As shown in FIG. 8 and FIG. 9, the photovoltaic paddle 7 includes one or more extensible masts 1, solar cells 8, a first paddle member 9, a second paddle member 10, and a blanket 11 for supporting the solar cells 8. A plurality of the solar cells 8 are arranged on the surface of the blanket 11. The photovoltaic paddle 7 is provided with the extensible masts 1 having a function of extending the blanket 11 in a planar shape and a function of winding the blanket 11 into the roll shape. The extensible masts 1 are arranged on both sides of the blanket 11 along the extension direction P, for example. The first paddle member 9 having a substantially cylindrical shape is attached to an end of the blanket 11 on the side of an origin where the blanket 11 starts to be wound. Here, the substantially cylindrical shape includes not only a cylindrical body whose cross-sectional shape in a plane perpendicular to the axial direction is a perfect circle but also an elliptical cylindrical body. Further, the second paddle member 10 having a substantially polygonal prism shape is attached to an end of the blanket 11 that is to be an end point at which the blanket 11 is wound, the end being in the side on which a satellite (not shown) is connected. Here, the substantially polygonal prism includes a prism having rounded corners of a polygon. Between the first paddle member 9 and the second paddle member 10, there are one or more extensible masts 1 and the blanket 11, each of which is connected to the first paddle member 9 and the second paddle member 10. The one or more extensible masts 1 and the blanket 11 may or may not be connected.

By supporting both ends of the blanket 11 by the first paddle member 9 and the second paddle member 10, the attitude control of the photovoltaic paddle 7 can be performed stably. The first paddle member 9 and the second paddle member 10 are made of, for example, carbon fiber-reinforced plastic. As the solar cell 8, for example, a gallium arsenide (GaAs) solar cell can be used. As the blanket 11, for example, Kapton film can be used.

When the photovoltaic paddle 7 is applied to an artificial satellite, the extensible mast 1 of the photovoltaic paddle 7 mounted on the artificial satellite is wound up at the time of launching of a rocket, so that the photovoltaic paddle 7 can be efficiently housed in the fairing of the rocket tip where the shape is limited. When the extensible mast 1 is extended after the artificial satellite has reached outer space, the photovoltaic paddle 7 becomes ready to generate power. The extension force in the extensible mast 1 can be obtained by releasing the internal stress generated in the first fiber layer 2 and the second fiber layer 3 at the time when the extensible mast 1 is wound, and by applying an electric current to heat the electric heating wire 4 mounted on the extensible mast 1. The power supply device for supplying electric current to the electric heating wire 4 may be installed on the artificial satellite itself or may be mounted on the photovoltaic paddle. By extending the retracted extensible mast 1, the photovoltaic paddle 7 having a large area can be implemented, and power generation with a large capacity can be obtained.

In the present embodiment, a gallium arsenide (GaAs) solar cell is used as the solar cell 8, but any device capable of generating electricity by solar light may be used, and for example, a solar cell made from a chemical compound of the rigid type like a silicon (Si) solar cell or a flexible solar cell such as an organic thin film solar cell can be used. In the case where a non-flexible solar cell is used as the solar cell 8, since a plurality of the solar cells 8 are arranged on the blanket 11 with spaces between the solar cells 8, bending of the solar cell 8 when the extensible mast is wound can be suppressed, and damage to the solar cell 8 can be prevented.

Although Kapton film is used as the blanket 11 in the present embodiment, a flexible film-like substrate having an insulating property may be used, and as examples for these materials, polyethylene naphthalate (PEN), polyethylene terephthalate (PET), liquid crystal polymer (LCP), or the like can be used. Although an artificial satellite has been described as an application example of the photovoltaic paddle 7, it may be used for other applications. The photovoltaic paddle 7 requires a large amount of electric power during operation, etc., but is suitable for a case where there is a dimensional restriction when electric power is not required during transportation, etc., and its application is not limited to artificial satellites.

As described above, the extensible mast of the photovoltaic paddle according to the present embodiment is provided with the first fiber layer 2 made of the fiber-reinforced plastic, the second fiber layer 3 made of the fiber-reinforced plastic, which is arranged in contact with the first fiber layer 2 and has a thermal expansion coefficient in the longitudinal direction larger than that of the fiber-reinforced plastic applied to the first fiber layer 2, and the electric heating wire arranged on the second fiber layer 3, and is characterized in that when the first fiber layer 2, the second fiber layer 3 and the electric heating wire 4 are wound and retracted in the roll shape, the number of times of the overlapping of the electric heating wire in different layers is minimized. Therefore, the transition of the extensible mast to the extension state or the wound state can be assisted by thermal stress caused by the difference in the thermal expansion coefficients between the first fiber layer and the second fiber layer without requiring a special drive unit. Thus, by using the extensible mast 1 in Embodiment 1, the elastic restoring force of the extensible mast is maintained while an increase in weight and volume is suppressed, whereby the photovoltaic paddle 7 having a large area can be implemented and power generation with a large capacity can be obtained.

Embodiment 4

Figure 10:
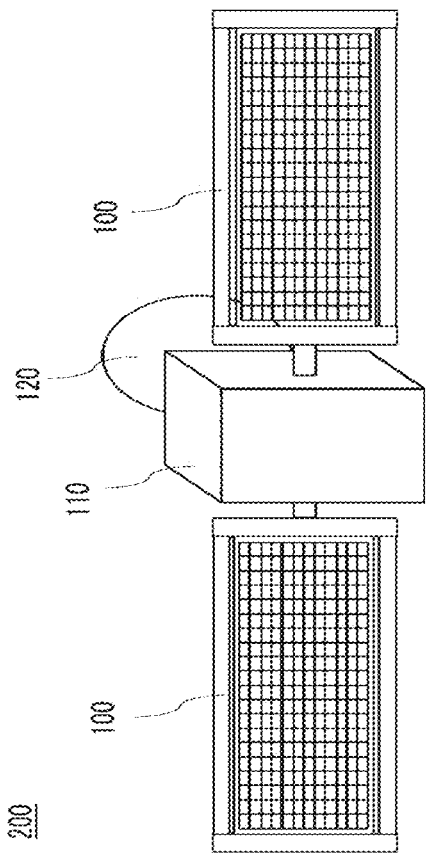
FIG. 10 is a perspective view showing a schematic configuration of an outer space structure provided with a photovoltaic paddle according to Embodiment 4 of the present disclosure.
Figure 11:
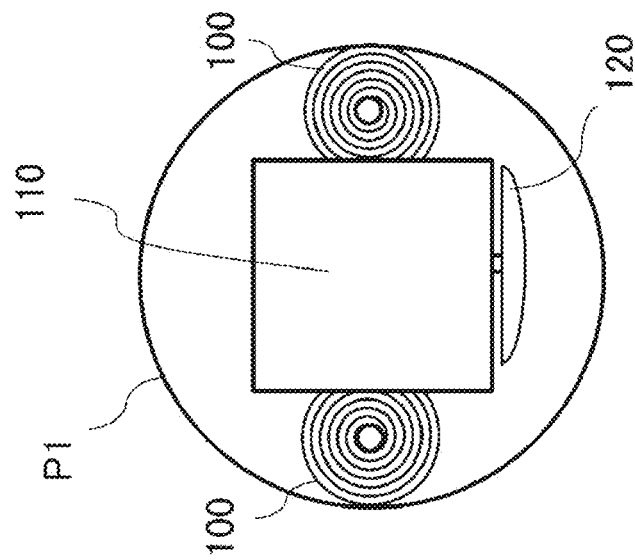
FIG. 11 is a plan view showing a schematic configuration of the outer space structure provided with the photovoltaic paddle according to Embodiment 4 of the present disclosure.
Figure 12:
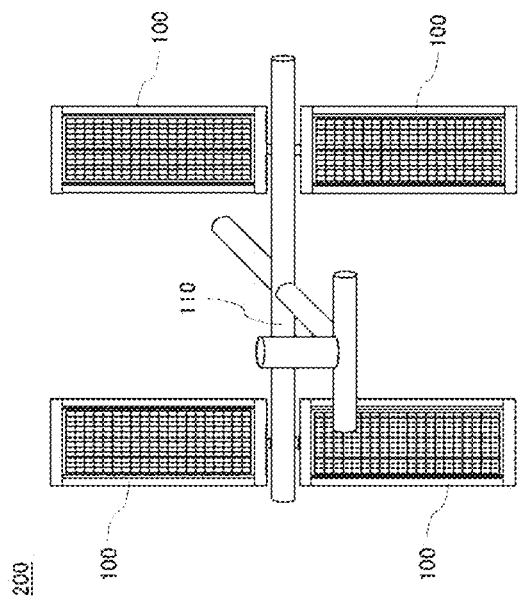
FIG. 12 is a schematic configuration diagram showing another example of an outer space structure provided with the photovoltaic paddle according to Embodiment 4 of the present disclosure.

Next, with reference to FIG. 10 to FIG. 12, an outer space structure provided with a photovoltaic paddle to which the extensible mast 1 according to Embodiment 1 for carrying out the present disclosure is applied will be described. In FIG. 10 to FIG. 12, the same reference numerals as those in FIG. 1 denote the same or corresponding components. In the following description, the points which are the same as those of Embodiment 1 are omitted, and the different points will be mainly described.

FIG. 10 is a schematic configuration diagram showing the outer space structure provided with a photovoltaic paddle according to Embodiment 4 of the present disclosure. As shown in FIG. 10, the outer space structure 200 is, for example, an artificial satellite, and includes photovoltaic paddles 100, a structure main body 110, and an antenna 120. The structure main body 110 is a satellite structure, for example, and the photovoltaic paddles 100 are connected to both sides of the structure main body 110, for example. The antenna 120 is attached to, for example, an upper surface or a front surface of the structure main body 110.

FIG. 11 is a schematic configuration diagram showing the outer space structure provided with the photovoltaic paddle according to Embodiment 4 of the present disclosure. FIG. 11 shows an artificial satellite when it is housed in the fairing P1, which is the tip portion of a rocket. As shown in FIG. 11, at the time of launching the rocket, the photovoltaic paddle 100 is housed in the fairing P1 of the rocket with the blanket 11 wound in the roll shape. The photovoltaic paddle 100 is to extend the blanket 11 together with the extensible mast 1 after the outer space structure 200 is exposed to the outer space. After the blanket 11 is extended, the solar cells 8 receive sunlight and start power generation.

As described above, the outer space structure 200 according to the present embodiment is provided with the first fiber layer 2 made of the fiber-reinforced plastic, the second fiber layer 3 made of the fiber-reinforced plastic, which is arranged in contact with the first fiber layer 2 and has a thermal expansion coefficient in the longitudinal direction larger than the thermal expansion coefficient of the fiber-reinforced plastic applied to the first fiber layer 2, and the electric heating wire arranged on the second fiber layer 3, and is characterized in that the number of times of the overlapping of the electric heating wire in different layers when the first fiber layer 2, the second fiber layer 3, and the electric heating wire 4 are wound and retracted in the roll shape is minimized. Therefore, it is possible to assist the transition of the extensible mast to the extension state or the wound state by thermal stress caused by the difference in thermal expansion coefficients between the first fiber layer 2 and the second fiber layer 3 without requiring a special drive unit. Therefore, by using the extensible mast 1 in Embodiment 1, the elastic restoring force of the extensible mast is maintained while an increase in weight and volume is suppressed, whereby the photovoltaic paddle 7 having a large area can be implemented and power generation with a large capacity can be obtained. Further, since the outer space structure 200 is provided with the photovoltaic paddle 100 capable of winding the blanket 11 into the roll shape by using the extensible mast, it can be easily housed in the fairing P1 of the rocket at the time of launch.

Although the outer space structure 200 is an artificial satellite, other space structures may be used. FIG. 12 is a schematic configuration diagram showing another example of an outer space structure provided with the photovoltaic paddles according to Embodiment 4 of the present disclosure. As shown in FIG. 12, the outer space structure 200 is, for example, a space station. The structure main body 110 of the space station includes, for example, a structural frame called a truss, and at least one photovoltaic paddle 100 is attached thereto. FIG. 12 shows an example in which the number of the photovoltaic paddles 100 is four, but it may be one or more than four.

In Embodiment 3 and Embodiment 4, two extensible masts are used, but it is sufficient to use at least one extensible mast, and for example, one extensible mast may be arranged at the center of the blanket 11.

Further, a plurality of constituent elements disclosed in Embodiment 1 to Embodiment 4 may be appropriately combined without departing from the scope and spirit of the present disclosure.

DESCRIPTION OF REFERENCE NUMERALS AND SIGNS 1 extensible mast, 2 first fiber layer, 3 second fiber layer, 4, 5, 6 electric heating wire, 7, 100 photovoltaic paddle, 8 solar cell, 9 first paddle member, 10 second paddle member, 11 blanket, 12 prepreg laminate, 13 shaft member, 14 bagging film, 15 sealing material, 110 structure main body, 120 antenna, 200 outer space structure.

The invention claimed is:

1. An extensible mast comprising:
a first fiber layer made of a fiber-reinforced plastic;
a second fiber layer that is arranged in contact with the first fiber layer and made of a fiber-reinforced plastic having a thermal expansion coefficient in a longitudinal direction larger than a thermal expansion coefficient in the longitudinal direction of the fiber-reinforced plastic applied to the first fiber layer; and
an electric heating wire arranged on the second fiber layer, wherein
the electric heating wire is arranged on the second fiber layer such that when the first fiber layer, the second fiber layer, and the electric heating wire are wound and retracted in a roll shape at least one portion of the electric heating wire in one of a plurality of different layers of the roll shape does not overlap the electric heating wire in another of the plurality of different layers of the roll shape.

2. The extensible mast according to claim 1, wherein the electric heating wire is arranged so as to be in a sine wave shape with a constant period and to have different amplitudes in the longitudinal direction.

3. A method of manufacturing an extensible mast comprising:
forming a prepreg laminate by winding around a shaft member a first fiber layer made of a fiber-reinforced plastic and a second fiber layer made of a fiber-reinforced plastic having a thermal expansion coefficient larger in a longitudinal direction than the thermal expansion coefficient in the longitudinal direction of the fiber-reinforced plastic applied to the first fiber layer;
covering the prepreg laminate wound around the shaft member with a bagging film and sealing the covered prepreg laminate with a sealing material;
placing the sealed prepreg laminate in an autoclave, and pressurizing and heating the prepreg laminate from outside the bagging film;
taking out the prepreg laminate from the autoclave, and removing the shaft member, the bagging film, and the sealing material; and
arranging an electric heating wire on a surface of the second fiber layer such that when the first fiber layer, the second fiber layer, and the electric heating wire are wound and retracted in a roll shape at least one portion of the electric heating wire in one of a plurality of different layers of the roll shape does not overlap the electric heating wire in another of the plurality of different layers of the roll shape.

4. The method of manufacturing an extensible mast according to claim 3, wherein the arranging of the electric heating wire is to arrange the electric heating wire on the surface of the second fiber layer so as to be in a sine wave shape with a constant period and to have different amplitudes in the longitudinal direction.

5. A photovoltaic paddle comprising:
a blanket;
the extensible mast according to claim 1, the extensible mast having a function of winding and retracting the blanket in the roll shape and a function of extending the blanket; and
a plurality of solar cells arranged on a surface of the blanket.

6. An outer space structure comprising:
the photovoltaic paddle according to claim 5; and
a structure main body to which the photovoltaic paddle is mounted.

7. A photovoltaic paddle comprising:
a blanket;
the extensible mast according to claim 2, the extensible mast having a function of winding and retracting the blanket in the roll shape and a function of extending the blanket; and
a plurality of solar cells arranged on a surface of the blanket.

8. An outer space structure comprising:
the photovoltaic paddle according to claim 7; and
a structure main body to which the photovoltaic paddle is mounted.

9. The extensible mast according to claim 1, wherein the electric heating wire is arranged so as to be in a triangular wave shape having a plurality of frequencies in the longitudinal direction.

10. The extensible mast according to claim 1, wherein the electric heating wire is arranged so as to be in a superimposed wave of sine waves having a plurality of frequencies in the longitudinal direction.

11. The extensible mast according to claim 1, wherein the electric heating wire is arranged so as to be in a repetitive shape having a changing amplitude in the longitudinal direction.

12. The method of manufacturing an extensible mast according to claim 3, wherein the arranging of the electric heating wire is to arrange the electric heating wire on the surface of the second fiber layer so as to be in a triangular wave shape having a plurality of frequencies in the longitudinal direction.

13. The method of manufacturing an extensible mast according to claim 3, wherein the arranging of the electric heating wire is to arrange the electric heating wire on the surface of the second fiber layer so as to be in a superimposed wave of sine waves having a plurality of frequencies in the longitudinal direction.

14. The method of manufacturing an extensible mast according to claim 3, wherein the arranging of the electric heating wire is to arrange the electric heating wire on the surface of the second fiber layer so as to be in a repetitive shape having a changing amplitude in the longitudinal direction.

* * * * *